000
United States Patent
Rotsch et al.

(10) Patent No.: US 7,082,175 B2
(45) Date of Patent: Jul. 25, 2006

(54) METHOD FOR CONTROLLED SYNCHRONIZATION TO AN ASTABLE CLOCK SYSTEM, AND RECEPTION UNIT CORRESPONDING THERETO

(75) Inventors: Hendrik Rotsch, Luppa (DE); Dietmar Wanner, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 669 days.

(21) Appl. No.: 09/855,899

(22) Filed: May 15, 2001

(65) Prior Publication Data

US 2002/0126782 A1 Sep. 12, 2002

(30) Foreign Application Priority Data

Sep. 21, 2000 (DE) .............................. 100 46 920

(51) Int. Cl.
*H04L 7/00* (2006.01)
(52) U.S. Cl. ....................................... 375/356; 713/503
(58) Field of Classification Search ................ 375/362, 375/376, 394, 371, 373, 354, 356; 713/400, 713/500, 503, 600
See application file for complete search history.

(56) References Cited

U.S. PATENT DOCUMENTS

| | | | | |
|---|---|---|---|---|
| 4,565,975 A | * | 1/1986 | Gegner et al. | 331/1 A |
| 4,598,257 A | * | 7/1986 | Southard | 331/2 |
| 5,003,559 A | * | 3/1991 | Kanai et al. | 375/358 |
| 5,748,569 A | | 5/1998 | Teodorescu et al. | 368/118 |
| 6,154,508 A | * | 11/2000 | Ott | 375/354 |
| 6,230,021 B1 | * | 5/2001 | Ohdachi | 455/502 |
| 6,297,849 B1 | * | 10/2001 | Stessen et al. | 348/500 |

FOREIGN PATENT DOCUMENTS

DE 19932635 8/2000
EP 0652642 10/1994

\* cited by examiner

*Primary Examiner*—Betsy L. Deppe
(74) *Attorney, Agent, or Firm*—Baker Botts L.L.P.

(57) ABSTRACT

A method for controlled synchronization to an astable clock system, and reception unit corresponding thereto are disclosed. Soft synchronization using a slight change in the period duration of the clock signal produced makes it possible to alter said clock signal such that a phase difference between the stable clock signal produced by a phased locked loop upon a synchronization signal and the clock signal produced for an application is slowly reduced until the two clock signals are in synchronization with one another after a period of time.

11 Claims, 3 Drawing Sheets

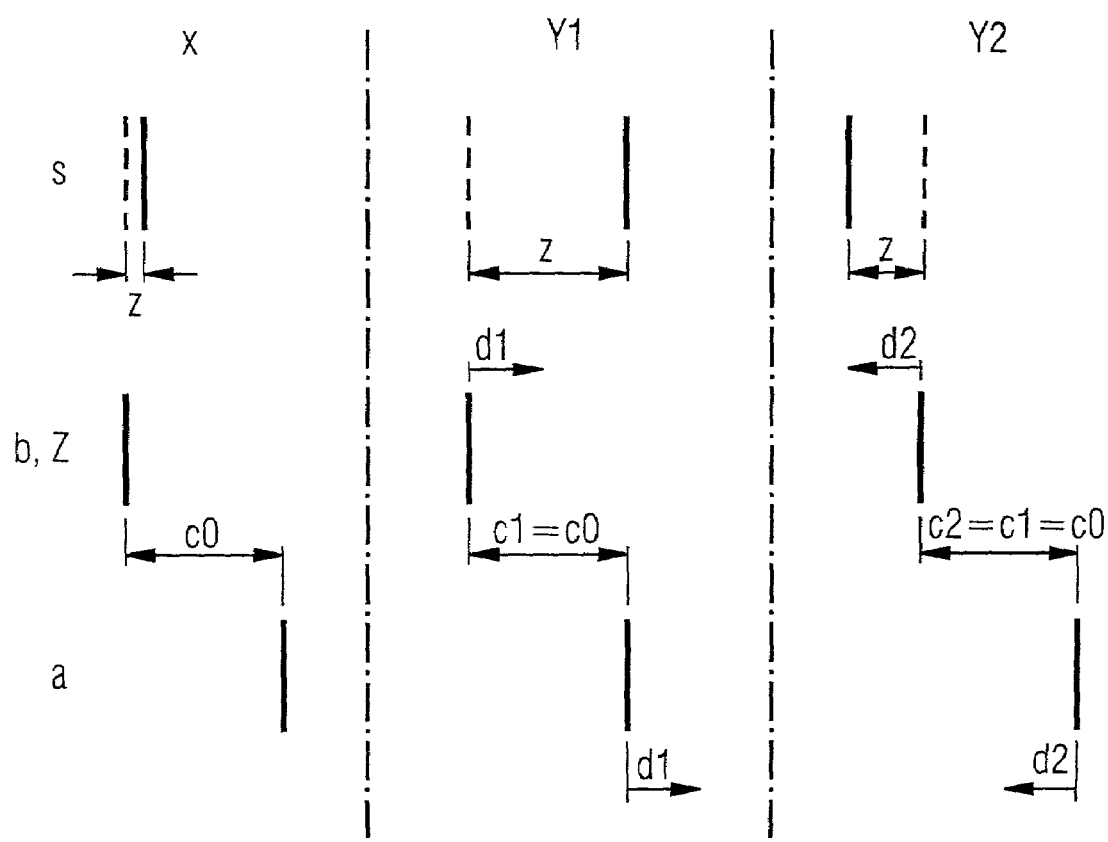

Figure 1:
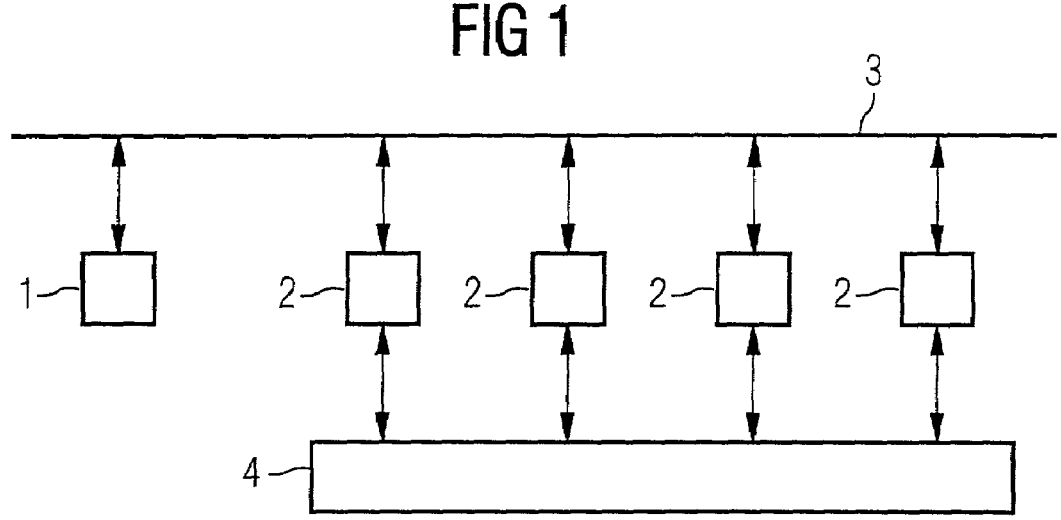

METHOD FOR CONTROLLED SYNCHRONIZATION TO AN ASTABLE CLOCK SYSTEM, AND RECEPTION UNIT CORRESPONDING THERETO

The present invention relates to a synchronization method for a reception unit, where cyclically emitted synchronization signals are transmitted to the reception unit by a transmission unit, where the reception unit supplies the synchronization signals to a first clock transmitter, where the first clock transmitter outputs an essentially stable number of clock signals between two synchronization signals, and also a reception unit corresponding thereto.

Such synchronization methods and the corresponding reception units are known generally. They are used, among other things, in fieldbus systems, e.g. in the PROFIBUS. Such fieldbus systems are distributed control systems which generally have a transmission unit (head assembly, bus master) and a multiplicity of reception units (slaves). The individual slave assemblies are usually driven by virtue of the transmission unit transmitting an instruction message to the reception units. Upon receipt of the instruction message, the reception units output to a controlled technical installation nominal values which have been transmitted to them previously by the transmission unit. At the same time, they read in from the controlled technical installation actual values which they subsequently transmit to the transmission unit. The transmission unit then calculates new nominal values which it transmits to the individual reception units, so that the reception units are ready for the next instruction message.

The instruction messages are sent by the transmission unit with equidistant timing. From the instruction messages it is therefore possible to derive synchronization signals which can be used to synchronize the reception units to the transmission unit.

In practice, some latitude in time remains between transmission of the actual values read in to the transmission unit and transmission of the nominal values to the reception units, on the one hand, and transmission of the next instruction message, on the other hand. This latitude is generally used for "acyclic" messages. In this context, delays by the acyclic messages may cause individual instruction messages to be sent late. Reception of such instruction messages sent late causes erroneous resynchronization of the reception units. In many applications, this erroneous resynchronization is not critical.

In time-critical applications, on the other hand, particularly when coupling interpolating drive axes, such erroneous resynchronization cannot be tolerated. To prevent it, a phase regulator has therefore been proposed such that the reception unit supplies the synchronization signals to the first clock transmitter via this phase regulator in a phase locked loop, and, upon receipt of the synchronization signals, the phase regulator ascertains instantaneous phase errors and readjusts the first clock transmitter such that the first clock transmitter outputs a nominal number of clock signals between two synchronization signals. To achieve sufficient accuracy in the synchronization with the transmission unit, it has been proposed that the phase regulator integrate the instantaneous phase errors to form an integration value, and that the integration value be corrected to form an integration fraction, the integration fraction being less than one (cf. DE 19932635.5).

The phase regulator in the phase locked loop (PLL) generates a stable clock signal essentially from a synchronization signal which is received via the fieldbus system and is subject to interference. If this synchronization signal received via the fieldbus system disappears permanently (e.g. no bus connection available any longer), then the phase regulator continues to produce a stable clock signal, although without being able to synchronize itself to the synchronization signal on the fieldbus system.

If the synchronization signal received via the fieldbus is permanently available again after some time (e.g. bus connection restored), this synchronization signal will generally be entirely asynchronous with respect to the stable clock signal produced by the phase regulator. If the phase regulator is stopped in this case, the stable clock pulses produced by the PLL disappear. If the phase regulator is restarted again, the stable clock pulses produced by the PLL are again produced in synchronism with the synchronization signal received via the fieldbus.

This conventional procedure is problematical, however, in terms of requirements of various applications, such as the coupling of interpolating drive axes. The synchronous operation of various axes, e.g. in the case of numerically controlled machine tools or robots, is dependent on the stable clock signal produced by the PLL. Actual values are stored in synchronism with this clock pulse, for example, and nominal values are output.

However, the result of the disappearance of the clock signal produced by the PLL is then that the machine tool is no longer able to determine the position of its axes and that the machine operator needs to rereference his axes.

For this reason, it is desirable, from an application point of view, for resynchronization to be able to be carried out without the stable clock pulses produced by the PLL disappearing.

Accordingly, resynchronization to the synchronization signal received from the fieldbus should be soft, i.e. should involve only a slight change in the stable clock signal produced by the PLL.

It is the object of the present invention to provide a synchronization method for a reception unit which allows soft synchronization to an astable clock system, and also a reception unit corresponding thereto.

The present invention achieves this object by developing the synchronization method described in the introduction on the basis of the preamble of the main claim, such that the stable clock signals are used to drive a second clock transmitter, where the second clock transmitter generates a second clock signal which is continuously present, even when the first stable clock signals are absent, where a phase difference arising between the first clock transmitter and the second clock transmitter is compensated for by influencing the period duration of the second clock transmitter.

The result of soft synchronization is that the clock signals produced largely keep their period duration, so that there is the assurance that applications called cyclically with this timing, such as software applications, can also be executed to the full extent. Since the clock signals largely maintain their period duration, the application also remains sufficiently accurate. Particularly at points where timing is critical, such as speed calculations etc., great advantages are obtained here as compared with a closed loop control solution. The process of soft synchronization thus barely differs from the normal operating state of the machine.

In this context, it has been found to be advantageous if only slight changes in the period duration of the second clock transmitter are made such that the phase difference is continuously reduced within a prescribed time period until the first and the second clock signal are synchronous with one another. In this way, the process of synchronization is particularly soft.

Synchronization is performed particularly effectively if the period duration of the second clock transmitter is influenced such that the shorter interval between the phases of the two clock signals is reduced.

In accordance with another advantageous refinement of the method according to the present invention, the second clock transmitter is driven with a prescribed standard period duration in the event of the first stable clock signal being absent. This ensures that, even if the synchronization signal disappears, autarchic operation of the application is possible.

When a phase regulator, outlined in the introduction, in a locked loop (PLL) is used to produce a first stable clock signal, the invention can be implemented particularly simply and effectively if fluctuations in the period duration of the first clock transmitter which are corrected by the phase regulator are mapped onto the second clock transmitter.

In this context, it has been found to be beneficial if the corrections in the period duration of the first clock transmitter which are ascertained by the phase regulator from clock pulse to clock pulse are taken into account both in the first stable clock signal and in the continuously present second clock signal.

Figure 2:
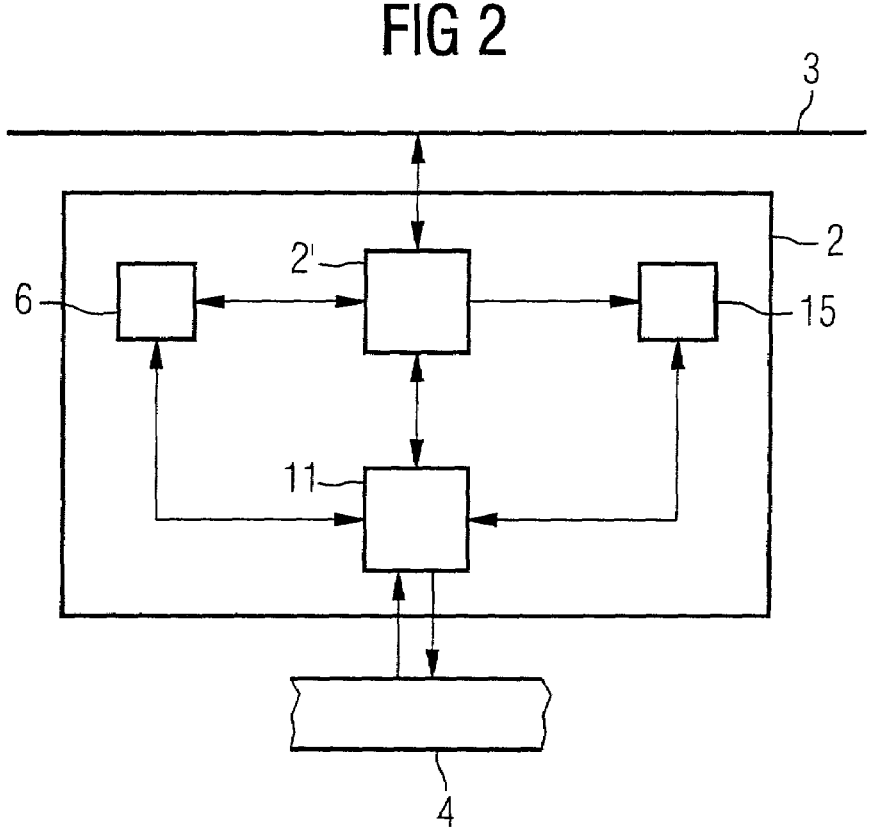
Figure 3:
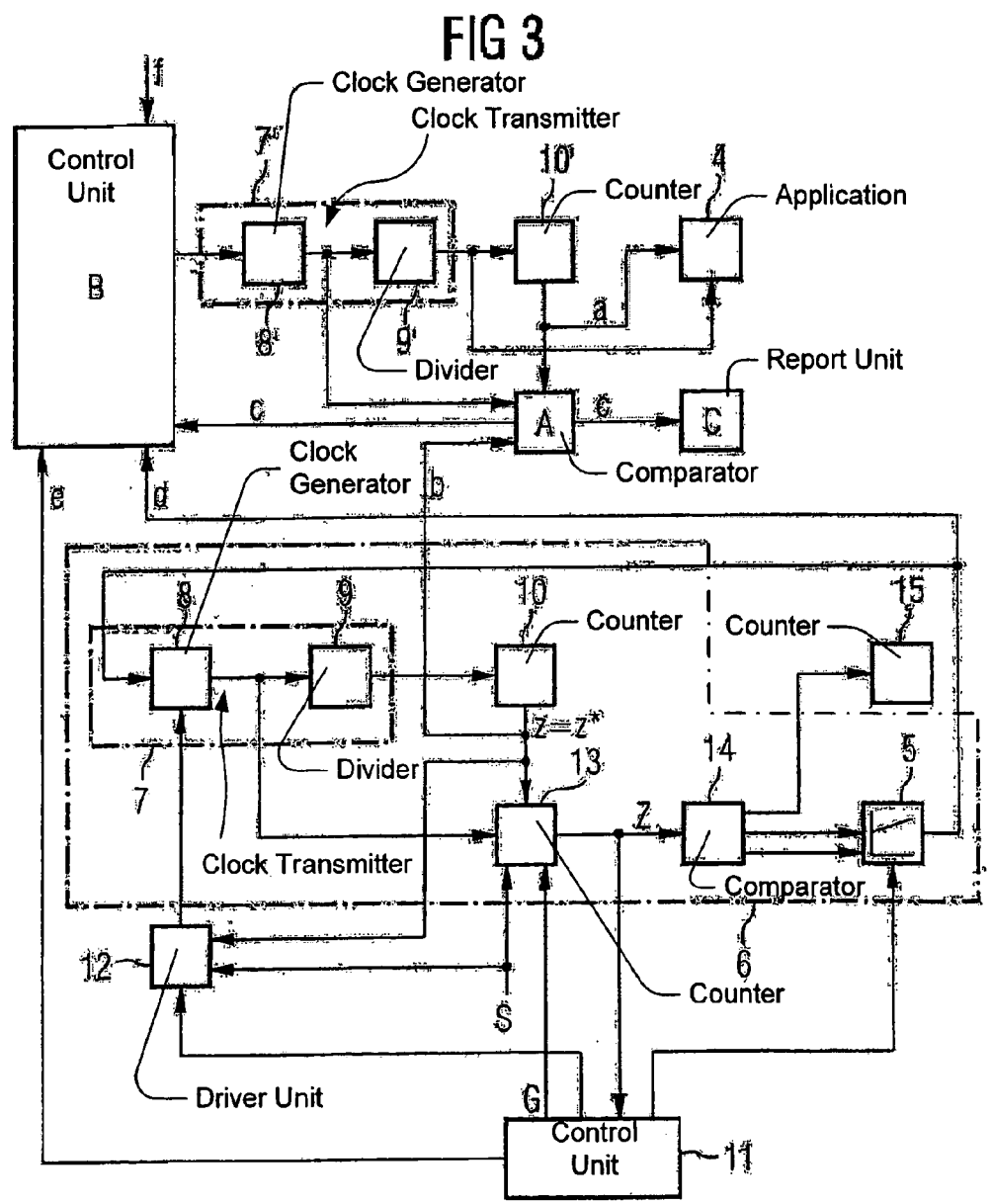

Other advantages and details of the invention can be found in the description below of an advantageous exemplary embodiment and in conjunction with the figures. In these, elements having the same functionality are identified using the same reference symbols. The figures show basic illustrations, in which FIG. 1 shows a distributed control system, FIG. 2 shows a reception unit, FIG. 3 shows a phase locked loop with a controlled clock transmitter connected downstream, and FIG. 4 shows a timing diagram for the controlled synchronization.

In accordance with FIG. 1, a distributed control system has a transmission unit 1 and reception units 2 connected to one another by means of a bus system 3. The transmission unit 1 cyclically transmits messages to the reception units 2, which react to the received messages accordingly. By way of example, the reception units 2 read in input variables from a controlled technical installation or application 4, and emit output variables to the technical installation or application 4. This is indicated in FIG. 1 by the arrows between the reception units 2 and the technical installation/application 4.

Usually, the transmission unit 1 and the reception units 2 communicate on the basis of the following, cyclically executed scheme:

First, the transmission unit 1 transmits to the reception units 2 output variables which are intended to be output to the technical installation/application 4. It then transmits an instruction message to the reception units 2. On transmission of the instruction message, the reception units 2 output the output variables to the technical installation 4 and read in input variables from the technical installation 4. The input variables read in are then requested by the transmission unit 1.

Ideally, the above scheme is executed strictly cyclically and with strictly equidistant timing. In particular, the instruction messages can therefore be used as synchronization signals S, or synchronization signals S can be derived from the instruction messages. The synchronization signals S can then be used to synchronize the reception units 2 to the transmission unit 1.

On the basis of FIGS. 2 and 3, the synchronization signals received by the reception units 2 are supplied via a bus connection module 2' to a phase regulator 5 in a phase locked loop 6. The phase locked loop 6 has a clock transmitter 7. Within the clock transmitter 7, a clock generator 8 produces primary clock signals which are supplied to a frequency divider 9. At the output, the frequency divider 9 outputs the divided primary clock signals as clock signals. The clock signals are supplied to a clock signal counter 10.

With ideal regulation of the clock generator 8, the clock transmitter 7 outputs exactly one nominal number Z* of clock signals between two synchronization signals S. However, the clock transmitter 7 generally outputs a number Z of clock signals which differs from the nominal number Z*. The phase regulator 5 therefore ascertains instantaneous phase errors z upon receipt of the synchronization signals, and then readjusts the clock transmitter 7 such that it outputs the nominal number Z* of clock signals between two synchronization signals S. This is done as follows:

Before the start of synchronization, that is to say before the first instantaneous phase error z is ascertained, a control unit 11 first prescribes a start signal for a driving unit 12. This driving unit then drives the clock generator 8 in the clock transmitter 7. When the clock signal counter 10 has counted the nominal number Z* of clock signals, the clock signal counter 10 transmits a signal to the driving unit 12. The driving unit then stops the clock generator 8 again. The phase locked loop 6 has thus been "biased", so to speak. Upon receipt of the next synchronization signal, which is likewise transmitted to the driving unit 12, the driving unit then starts the clock generator 8 again. This increments the clock signal counter 10 again.

The reaching of the nominal number Z* and the arrival of the next synchronization signal S are reported to a primary clock counter 13. Upon the arrival of the first of these two signals, the primary clock counter 13 is started; upon the arrival of the second of the two signals, it is stopped. The count (which has an arithmetic sign) of the primary clock counter 13 is thus a direct measure of the error between the clocking of the clock transmitter 7 and the periodicity of the synchronization signals S.

Upon receipt of the first synchronization signal S after the clock transmitter 7 has been restarted, the count of the primary clock counter 13 is transmitted to the control unit 11. The control unit uses it to calculate a correction value for driving the clock generator 8, and prescribes this correction value directly to the phase regulator 5. This at least substantially corrects the instantaneous phase error z detected during the first synchronization cycle.

In the further synchronization cycles, the primary clock counter 13 is always controlled on the basis of the synchronization signal S and the reaching of the nominal number Z*. The primary clock counter 13 is started upon the arrival of the first of these two signals and is stopped upon the arrival of the second of these two signals. The count of the primary clock counter 13 is supplied to a comparator 14.

The count on the primary clock counter 13 is compared with a maximum error. If the count exceeds the maximum error, a timeout counter 15 is incremented. In this case, no error signal is output to the phase regulator 5. The phase regulator 5 maintains its previous output signal.

The primary clock counter 13 is usually started and stopped whenever a synchronization signal S is transmitted. However, it is also possible for a validity signal G to be additionally transmitted to the phase locked loop 6 by the control unit 11. In this case, the primary clock counter 13 is started and stopped only if the validity signal G is present.

It is also possible to start and to evaluate the primary clock counter 13 with a phase offset with respect to the synchronization signal S.

If the phase regulator corrects the instantaneous phase errors to form a proportional fraction, with the proportional fraction being less than one, the phase error is corrected more quickly. This applies particularly when the proportional fraction is greater than the integration fraction.

If the phase regulator readjusts the clock transmitter only when the absolute value of the instantaneous phase error does not exceed a maximum error, delays in the synchronization signals as a result of acyclic messages do not cause erroneous readjustment of the clock transmitter.

If a counter is incremented when the maximum error is exceeded, it is possible to detect a permanent error in the communication between transmission unit and reception unit, in particular.

If a control unit transmits a validity signal to the phase locked loop, and the synchronization method is carried out only when the validity signal is present, it is necessary to ensure that the correct synchronization signals are used for synchronization.

If a clock generator within a clock transmitter produces primary clock signals which are supplied to a frequency divider whose output emits the divided primary clock signals as clock signals, it is certain that all the components arranged between the clock generator and the frequency divider are likewise synchronized in the correct phase.

If, before the first instantaneous phase error is ascertained, the clock transmitter outputs the nominal number of clock signals, is then stopped and is restarted upon receipt of the next synchronization signal, the reception unit is synchronized particularly rapidly upon startup.

If, upon receipt of the first synchronization signal after the clock transmitter has been restarted, the instantaneous phase error is at least essentially corrected and integration of the instantaneous phase errors and correction of the integration value, and possibly also correction of the instantaneous phase error, are not carried out until after receipt of the second synchronization signal, synchronization at the start of the method is speeded up even further.

In accordance with the present invention, the stable clock signal Z produced by clock signal counter 10 in the phase locked loop 6 (PLL) is used only as an intermediate signal "b." For the actual application 4 operated on the bus system 3 by the reception unit 2, another continuously present clock signal "a" is produced. This is done using a further clock transmitter 7' which produces second primary clock signals and a frequency divider 9' connected downstream. The output signals therefrom are applied to a clock signal counter 10' connected downstream. The way in which these components work is thus essentially equivalent to that for the phase locked loop 6.

The intermediate signals b at the output of the first clock counter 10 in the phase locked loop 6 and the continuously present second clock signals a at the output of the further clock counter 10' are supplied to a further comparator A for ascertaining the difference between the clock signals a for the application 4 and the stable clock signals b from the phase locked loop 6. As the measurement result, the difference c is supplied to a reporting unit C as a measure of the phase difference between the two clock signals a and b. This reporting unit reports when c becomes zero, which means that the clock signal a for the application 4 is synchronous with the phase locked loop 6 and hence with the synchronization signal of the bus system 3.

In addition, the phase difference c is passed to a control unit B. This control unit additionally receives the regulator output d of the phase regulator 5 and also a status signal e. The status signal e delivers information relating to the state of the phase locked loop 6, whether the PLL is locked and stable, or else not locked, astable, turned off or during the startup phase. A further signal f passed to the control unit B provides the request for "soft" synchronization when needed.

The following manner of operation is now selected for the control unit B:

If the status signal e signals that the PLL 6 is not stable (not locked, turned off, startup phase etc.), the clock generator 8' is driven with a prescribed standard period duration. The clock generator 8 thus runs decoupled from the PLL 6 and allows the application 4 to continue to operate autonomously without interruption.

If, by contrast, the status signal e signals that the PLL 6 is stable or locked, the clock generator 8' is driven using the regulator output d of the phase regulator 5, i.e. like the phase locked loop 6. The clock signals a and b are thus produced exactly equally, i.e. the phase difference c remains constant even if the clock signal b has slight fluctuations in period duration.

If the comparator A detects a phase difference c between the first clock signal b and the second clock signal a, which is continuously present, for the application 4, the request signal f is used to ask the control unit B to drive the clock generator 8' with a value which is slightly modified as compared with the regulator output d, so that the phase difference c is gradually reduced.

The slight change in the period duration of the clock signal a produced for the application 4 enables said clock signal a to be altered such that the phase difference c between the stable clock signal b produced by the PLL 6 and the clock signal a produced for the application 4 is slowly ("softly") reduced until, after a certain time, the two clock signals a, b are synchronous or have been synchronized with one another. For this purpose, the phase regulator 5 needs to be turned on (again), i.e. needs to produce clock pulses. By continuously measuring a phase difference between the stable clock signal b produced by the PLL 6 and the clock signal a produced for the application 4, this phase difference can be gradually equalized to zero at any time by specifically changing the period duration of the clock signal a produced for the application 4.

If the phase difference is +1000 ns, for example, then the period duration is now shortened by 10 ns in each case, for example in 100 periods of the clock signal a produced for the application 4. This slowly and gradually reduces this phase difference to zero ("soft synchronization").

Turning off the stable clock signal b produced by the PLL 6 and turning it on again thus has no effect on the clock signal a produced for the application 4. The application 4 can be operated without interruption.

If—as in the exemplary embodiment—the first clock transmitter 7 is regulated by means of a phase locked loop 6, it is necessary to ensure that the measured phase difference c does not alter from measurement to measurement on account of the control response of the PLL 6, so that the control unit B can drive the second clock transmitter 7' such that the phase difference c can be reduced specifically.

To achieve this, the fluctuations in the period duration of the stable clock signal b produced by the PLL 6 are also—on account of the unavoidable control response of the PLL 6—mapped in the clock signal a produced for the application 4, provided that the phase regulator 5 is not currently turned off This means that the corrections in the period duration which are ascertained from clock pulse to clock pulse by the PLL 6 are taken into account both in the stable clock signal b produced by the PLL 6 and in the clock signal a produced for the application 4. The phase difference c thus remains constant if the control unit B forwards only the regulator output d to the second clock transmitter 7'.

This relationship is shown in the illustration in FIG. 4. To this end, various cases X, Y and Z are shown, with the following signals being plotted above one another: received synchronization signal S, stable clock signal b produced by the PLL 6 and clock signal a, which is continuously present and is produced for the application 4.

Case X shows a situation in which the synchronization signal S is subject to slight jitter z (deviations from the ideal expected clock instant). This is indicated by virtue of the actual clock signal (unbroken line) being situated slightly to the side of an ideal expected clock instant (shown dotted). The stable clock signal b generated by the PLL 6 is then situated virtually exactly at the expected clock instant. The clock signal a produced for the application 4 is then situated to the side of the ideal exact clock instant with a possibly constant phase difference c0.

In case Y1 or Y2, the synchronization signal S has a large degree of jitter z. This means that the PLL 6 produces a severe internal control response d1 or d2 in order to generate a clock signal b which is synchronous with the synchronization signal S. This would now have a negative effect on the clock signal a shifted by a phase difference c, because the control response of the PLL 6 would mean that this phase difference c would not remain constant, but instead would also change on the basis of the control response of the PLL 6. However, since the control unit B takes the regulator output d into account when driving the second clock transmitter 7', the phase difference c remains constant C0. The PLL control response thus changes over to the application clock signal a.

By virtue of the oscillations at the regulator output d now being mapped onto the final clock signal a for the application 4 in cases Y1 and Y2, this clock signal a now behaves in exactly the same way as the first clock signal b from the PLL 6. This produces a defined phase difference c between the clock signals a and b. The two clock signals a, b thus appear identical and are shifted in time with respect to one another merely by a fixed phase shift. On the basis of these clock signals, the "soft synchronization" described above can then take place without difficulty.

In principle, the problem can also be solved by virtue of the clock signal a produced for the application 4 being regulated directly to the received clock signal b or to the synchronization signal S. However, this has the following disadvantages:

The "soft synchronization" needs to be carried out in the controlled variable of the regulator 5 (=corrections ascertained by the PLL) by a limiter. This nonlinearity complicates the control loop. Said nonlinearity needs to be examined on the basis of closed loop control technology and taken into account in the control loop (e.g. using additional limiters in the integral component of the regulator).

In the application instance for a PROFIBUS, the PLL 6 is designed for correcting phase differences of approximately 1 µs (order of magnitude of the maximum jitter). The control parameters of the PLL 6 are therefore set very slowly or "softly" in order to filter the jitter. The phase shifts c arising during "soft synchronization" are situated in the ms range, however. This means that other, faster and hence "harder" control parameters would be needed first. Changeover between these two control parameter sets would again represent a further nonlinearity in the control loop, which in turn complicates the control loop. This would again need to be examined on the basis of closed loop control technology, and the necessary consequences would need to be derived.

On the basis of closed loop control technology, it would be necessary to take account of the fact that the phase differences c are situated in the order of magnitude of the clock period durations. Depending on the control response, the two clocks under consideration could "overtake" one another, which could result in jumps in the phase difference measurement A. This in turn represents a nonlinearity whose consequences would need to be examined.

All these points represent increased levels of involvement with no advantage as compared with the open loop control solution in accordance with the present invention. Reducing the problem to an open loop controller instead of a closed loop controller allows significant simplification by contrast.

The method according to the invention allows, in particular, even interpolating axes with distributed control to be driven with sufficient accuracy.

The invention claimed is:

1. A synchronization method for a reception unit, said method comprising:
   transmitting synchronization signals from a transmission unit to at least one reception unit;
   supplying said synchronization signals to a phase locked loop (PLL) unit having a phase regulator, said PLL unit generating a first clock signal comprising a stable number of clock signals between two of said synchronization signals; and
   if said PLL unit does not operate in a stable mode then controlling a controllable clock generation unit with a predetermined control signal for generating a second clock signal, and
   if said PLL unit operates in a stable mode then controlling said controllable clock generation unit with a signal generated by said phase regulator to generate said second clock signal and comparing a phase difference arising between said first clock signal and said second clock signal to generate a compensation signal for said controllable clock generation unit, wherein said compensation signal reduces the phase difference with predetermined steps.

2. The method of claim 1, wherein only slight changes in said second clock signal are made by said compensation signal such that said phase difference is continuously reduced within a prescribed time period until said first clock signal and said second clock signal are synchronous with one another.

3. The method of claim 1, wherein corrections in a period duration of said first clock signal, which are ascertained by said phase regulator from clock pulse to clock pulse, are taken into account both in said first clock signal and in said second clock signal.

4. A reception unit for synchronizing signals, said reception unit comprising:
   a first clock transmitter, said first clock transmitter comprising a phase locked loop (PLL) unit outputting a first clock signal comprising a stable number of clock signals between two synchronization signals received from a transmission unit; and
   a second clock transmitter, said second clock transmitter using said first clock signal, said second clock transmitter generating a second clock signal with a predetermined clock frequency when said first clock signal is absent, and if said first clock signal is present generating said second clock signal with a predetermined clock frequency according to an output signal of a phase regulator in said PLL unit, wherein a phase difference arising between said first clock signal and said second clock signal is compensated for by controlling said second clock signal in such a way that the phase difference between the first and second clock signal is reduced with predetermined steps.

5. The method of claim 4, wherein said phase regulator, upon receiving said synchronization signals, ascertains instantaneous phase errors and readjusts said first clock signal such that said first clock transmitter outputs a nominal number of clock signals between two synchronization signals.

6. A circuit for synchronizing signals comprising:
a phase locked loop (PLL) circuit receiving synchronization signals and generating a first clock signal comprising a predetermined number of clock pulses between subsequent synchronization signals, wherein the PLL circuit comprises a phase regulator generating a phase regulating signal;
a clock generation circuit receiving a control signal for generating a second clock signal,
a phase comparator for comparing the phases of said first clock signal and said second clock signal, wherein said phase comparator generates a phase comparison signal;
a control unit for generating said control signal, wherein said control unit receives said phase regulating signal and wherein said control signal generates an independent control signal to generate said second clock signal in case said PLL circuit operates in an unlocked mode and provides said phase regulating signal to said clock generation circuit in case said PLL circuit operates in a locked mode, wherein said control unit receives said phase comparison signal and adjusts said second clock signal stepwise to compensate a phase difference between said first and second clock signal.

7. The circuit according to claim 6, wherein steps in said stepwise adjustment of said phase are small in comparison to said phase difference.

8. The circuit according to claim 6, wherein said clock generation circuit comprises a controllable clock generator coupled with a frequency divider.

9. The circuit according to claim 8, wherein said frequency divider is coupled with a clock counter, wherein said clock counter generates said second clock signal.

10. The circuit according to claim 6, wherein said PLL circuit comprises a controllable clock generator coupled with a frequency divider coupled with said phase regulator.

11. The circuit according to claim 10, wherein said frequency divider is coupled with a clock counter, wherein said clock counter generates said first clock signal.

* * * * *